United States Patent
Suzuki

(10) Patent No.: US 11,632,335 B2
(45) Date of Patent: Apr. 18, 2023

(54) COMMUNICATION APPARATUS, CONTROL METHOD, AND STORAGE MEDIUM

(71) Applicant: CANON KABUSHIKI KAISHA, Tokyo (JP)

(72) Inventor: Tomoya Suzuki, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 17/462,922

(22) Filed: Aug. 31, 2021

(65) Prior Publication Data
US 2022/0078125 A1    Mar. 10, 2022

(30) Foreign Application Priority Data
Sep. 10, 2020  (JP) ............................. JP2020-152248

(51) Int. Cl.
| | |
|---|---|
| H04L 12/841 | (2013.01) |
| H04L 47/283 | (2022.01) |
| H04L 49/9057 | (2022.01) |
| H04L 47/56 | (2022.01) |

(52) U.S. Cl.
CPC .......... *H04L 47/283* (2013.01); *H04L 47/564* (2013.01); *H04L 49/9057* (2013.01)

(58) Field of Classification Search
CPC ....... H04L 47/283; H04L 47/50; H04L 47/56; H04L 47/564; H04L 49/9057
USPC ......................................................... 370/329
See application file for complete search history.

(56) References Cited

U.S. PATENT DOCUMENTS

| | | | | |
|---|---|---|---|---|
| 9,602,246 | B2* | 3/2017 | Mendes Alves Da Costa | ............ H03M 13/615 |
| 9,742,707 | B2* | 8/2017 | Tsirkin | ................ H04L 49/9057 |
| 2011/0184963 | A1* | 7/2011 | Singh Thakur | ....... H04L 67/565 707/755 |
| 2013/0089031 | A1* | 4/2013 | Bertagna | ............. H04L 49/9057 370/328 |
| 2014/0064299 | A1* | 3/2014 | Shojania | ................. H04L 47/28 370/412 |
| 2018/0212886 | A1* | 7/2018 | Contavalli | ............ H04L 47/225 |

FOREIGN PATENT DOCUMENTS

JP    H09-200290 A    7/1997

* cited by examiner

*Primary Examiner* — Robert J Lopata
(74) *Attorney, Agent, or Firm* — Canon U.S.A., Inc. IP Division

(57) ABSTRACT

A communication apparatus determines whether to delete a packet yet to be transmitted that is stored in a transmission queue from the transmission queue when new data to be transmitted to another communication apparatus is generated. In a case where the packet yet to be transmitted is determined to be deleted, the communication apparatus deletes the packet yet to be transmitted that is stored in the transmission queue while maintaining the communication connection with the another communication apparatus, and transmits a packet to be transmitted corresponding to the new data to the another apparatus.

9 Claims, 6 Drawing Sheets

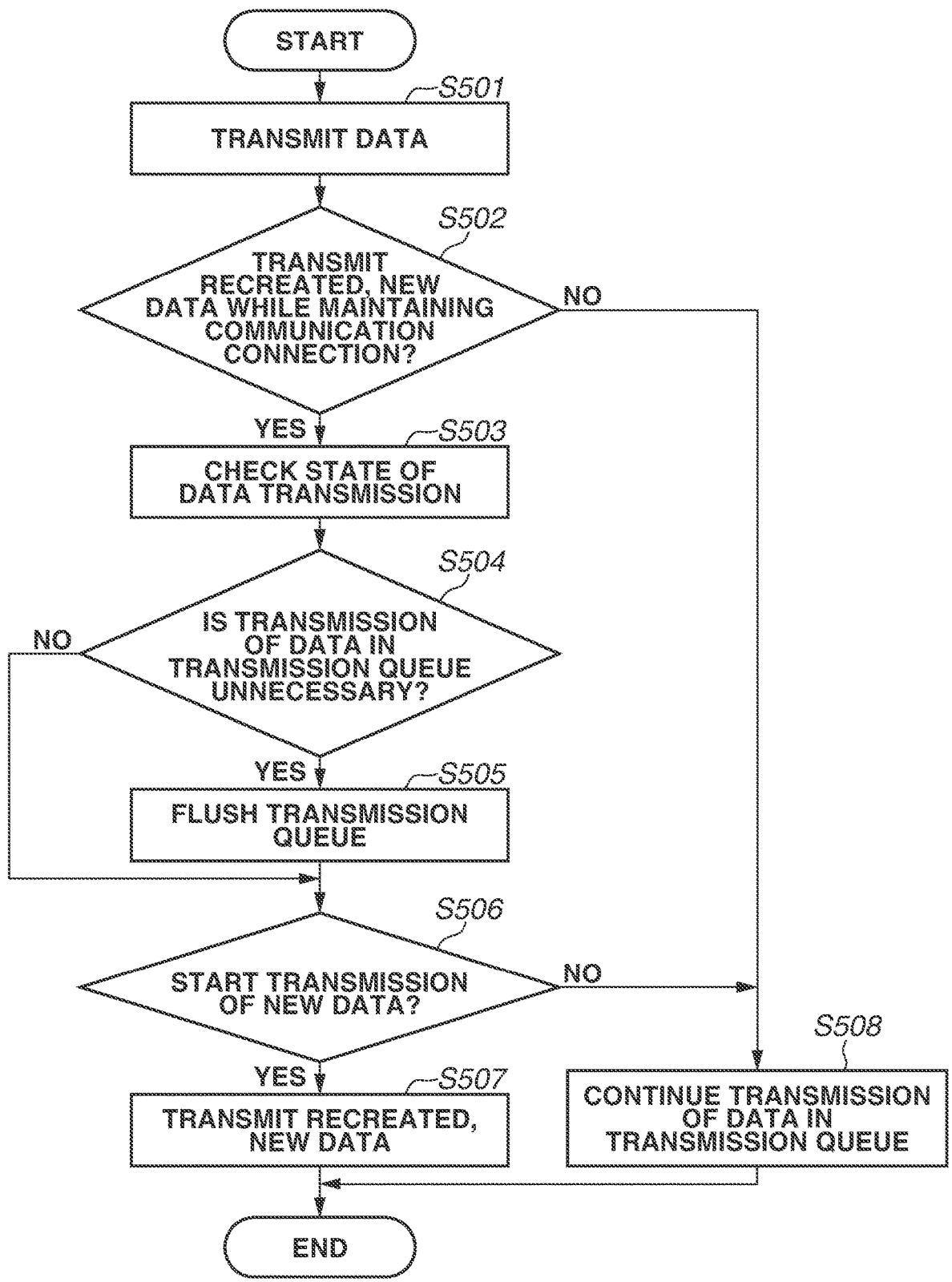

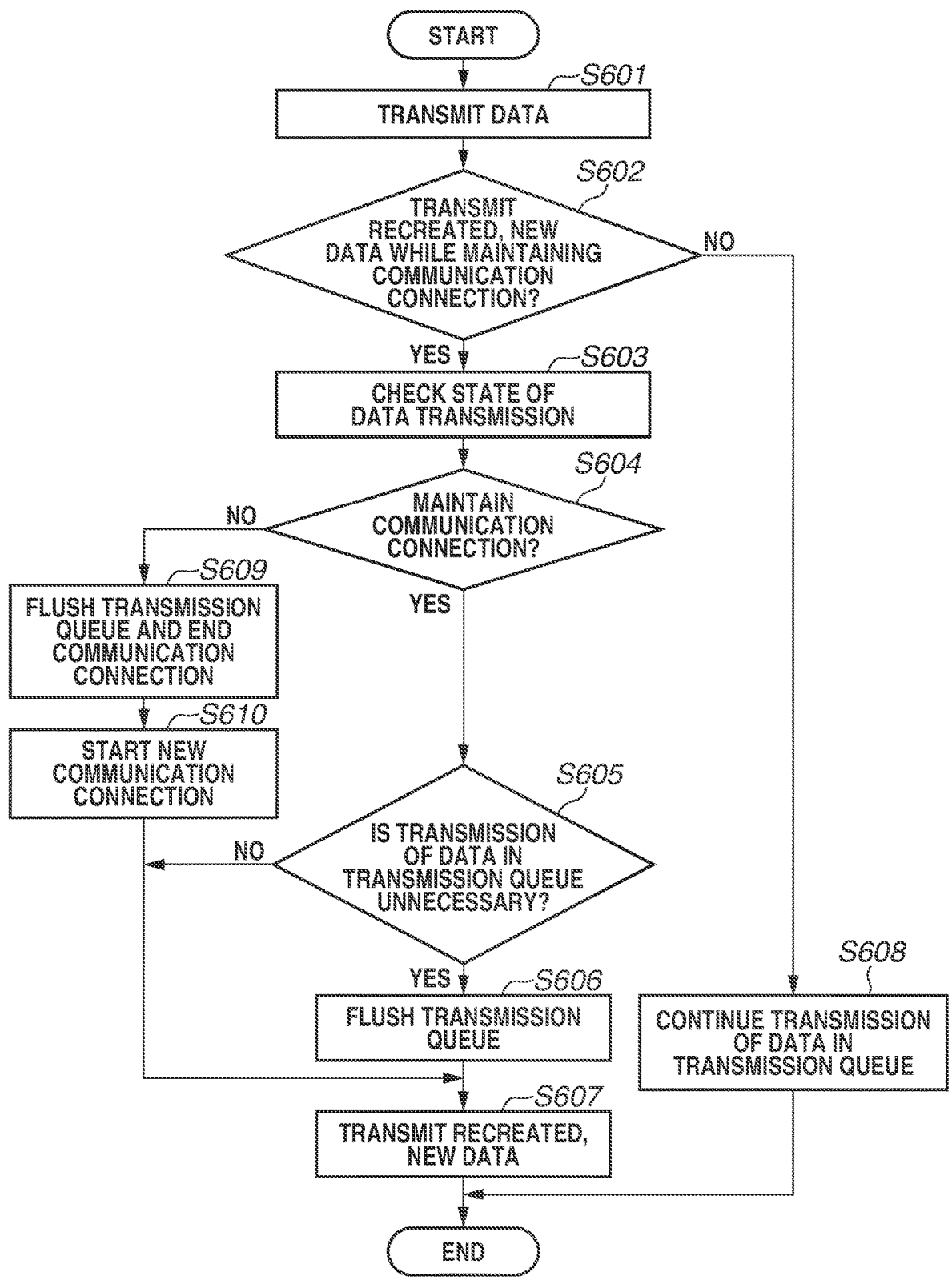

COMMUNICATION APPARATUS, CONTROL METHOD, AND STORAGE MEDIUM

BACKGROUND

Field of the Disclosure

The present disclosure relates to a communication apparatus that manages packets to be transmitted using a transmission queue.

Description of the Related Art

Proposed is a communication apparatus that manages packets to be transmitted with a transmission queue, and then transmits the packets to be transmitted to a network. In such a communication apparatus, there is a possibility that packets yet to be transmitted are retained in the transmission queue. As a method of eliminating the retention in the transmission queue, a method that has been considered is to stop transmission of data once while maintaining communication connection to an apparatus on the other end, wait until a factor that causes the retention in the transmission queue is solved, and thereafter resume transmission of data (Japanese Patent Application Laid-Open No. H9-200290).

However, the method according to Japanese Patent Application Laid-Open No. H9-200290 has the following issue. In a case of creating and transmitting new data to be transmitted, a communication apparatus is unable to start transmission of the newly created data unless transmission of packets yet to be transmitted that are retained in the transmission queue is completed, thereby causing a delay.

SUMMARY

Some embodiments are directed to provision of a communication apparatus capable of promptly transmitting packets corresponding to newly created data even in a case where packets yet to be transmitted are present in a transmission queue.

According to an aspect of some embodiments, a communication apparatus includes a transmission queue configured to store a packet to be transmitted that is transmitted to another communication apparatus via communication connection with the another communication apparatus, a determination unit configured to, when new data to be transmitted to the another communication apparatus is generated, determine whether to delete a packet yet to be transmitted from the transmission queue, the packet yet to be transmitted being the packet to be transmitted that is stored in the transmission queue and that has not been transmitted to the another communication apparatus, a deletion unit configured to, in a case where the determination unit determines to delete the packet yet to be transmitted, delete the packet yet to be transmitted that is stored in the transmission queue while maintaining the communication connection, and a transmission unit configured to, in a case where the deletion unit deletes the packet yet to be transmitted, transmit a packet to be transmitted corresponding to the new data to the another apparatus via the communication connection.

Further features of various embodiments will become apparent from the following description of exemplary embodiments with reference to the attached drawings.

BRIEF DESCRIPTION OF THE DRAWINGS

FIG. 5 is a flowchart implemented by a communication apparatus according to a third exemplary embodiment.

FIG. 6 is a flowchart implemented by a communication apparatus according to a fourth exemplary embodiment.

DESCRIPTION OF THE EMBODIMENTS

Figure 1:
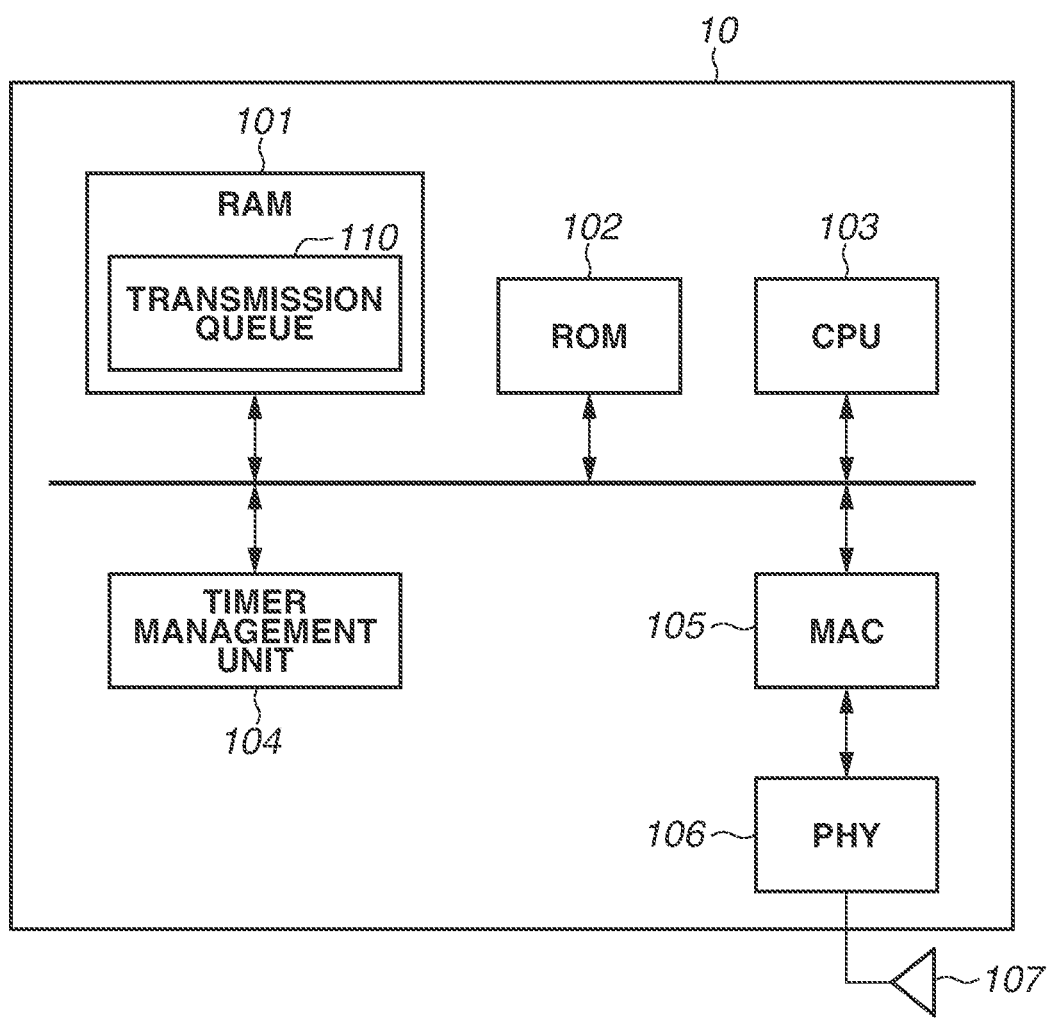
FIG. 1 is a diagram illustrating a hardware configuration of a communication apparatus.

FIG. 1 is a diagram illustrating a hardware configuration of a communication apparatus 10 according to a first exemplary embodiment. The communication apparatus 10 includes a random-access memory (RAM) 101, a read-only memory (ROM) 102, a central processing unit (CPU) 103, a timer management unit 104, a media access control module (MAC) 105, a physical layer module (PHY) 106, and an antenna 107. The communication apparatus 10 can have a configuration including a part of the modules described above.

The RAM 101 temporarily stores therein a program and data. A part of a memory region of the RAM 101 is used as a transmission queue 110. The ROM 102 stores therein a computer program, and various kinds of information, such as communication parameters for wireless communication. The computer program is a program requiring no change and used for performing various kinds of operations, which will be described below. The CPU 103 controls the whole of the communication apparatus 10. The CPU 103 executes various kinds of programs stored in a storage medium of a program storage unit, such as the ROM 102 or a hard disk drive (HDD) that is not illustrated, using the RAM 101 being a main memory as a work memory. The CPU 103 includes one or more processors or one or more cores.

The timer management unit 104 manages time elapsed in processing of a program and the like. Each of the MAC 105 and the PHY 106 is a communication unit for performing communication using the antenna 107 via a network, such as a wireless local area network (LAN). The CPU 103 implements a network driver and controls the MAC 105 to transmit/receive data.

Specific examples of the communication apparatus 10 include a sensor device, a digital camera, a digital video camera, a mobile phone, a smartphone, a personal computer (PC), a note PC, and a server. The communication apparatus 10 performs communication via a wireless LAN in conformity with the Institute of Electrical and Electronics Engineers (IEEE) 802.11 series. However, a communication function is not limited thereto, and the communication apparatus 10 can perform communication utilizing another wireless communication function. Also, the communication apparatus 10 can utilize a wired LAN communication function, such as the Ethernet, or a combination of a wireless LAN communication function and the wired LAN communication function.

Figure 2:
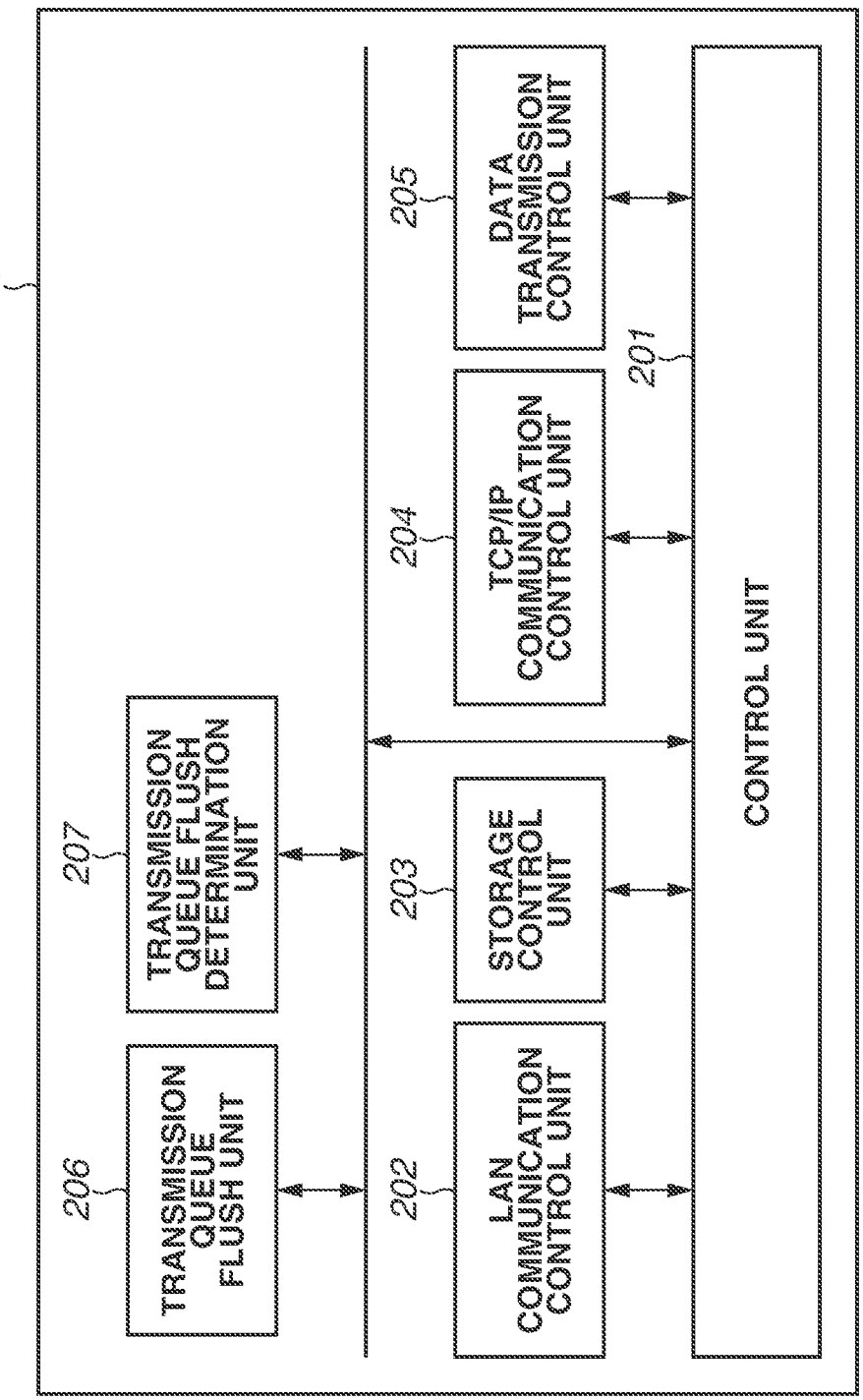
FIG. 2 is a diagram illustrating a software configuration of the communication apparatus.

FIG. 2 illustrates a software functional block implemented by the CPU 103 of the communication apparatus 10 reading out a program stored in the ROM 102. At least a part of the software functional block illustrated in FIG. 2 can be implemented by hardware. In the case where the part of the software functional block is implemented by hardware, for example, a dedicated circuit can be formed on a field-programmable gate array (FPGA) from a program for implementing each functional block using a predetermined compiler and be used as a hardware module having a corresponding function of each software module. Alternatively, the part of the software functional block can be implemented as hardware by forming a gate array circuit similarly to the FPGA.

The communication apparatus 10 includes a control unit 201, a LAN communication control unit 202, a storage control unit 203, a Transmission Control Protocol/Internet Protocol (TCP/IP) communication control unit 204, a data transmission control unit 205, a transmission queue flush unit 206, and a transmission queue flush determination unit 207. The communication apparatus 10 can have a configuration including a part of the modules described above.

The control unit 201 controls individual functional modules of the communication apparatus 10. An application uses the individual functional modules via the control unit 201.

The LAN communication control unit 202 controls the MAC 105 to control LAN communication with another communication apparatus. In a case where the communication apparatus 10 is connected to another communication apparatus via an external wireless access point (not illustrated), the LAN communication control unit 202 controls the MAC 105 to control wireless LAN communication with the wireless access point. A communication system is not limited thereto, and the LAN communication control unit 202 can utilize another communication system, such as a wired LAN communication function.

The storage control unit 203 controls the RAM 101 and the ROM 102 to store or delete data, such as processing data, image contents, and video contents. While an example of utilizing the RAM 101 and the ROM 102 is described in the present exemplary embodiment, a storage unit is not limited thereto, and another storage unit, such as an auxiliary storage device, can be utilized.

The TCP/IP communication control unit 204 performs TCP/IP communication protocol processing and communication control with another communication apparatus using the LAN communication control unit 202. The TCP/IP communication control unit 204 can perform not only TCP/IP communication, but also communication in a transmission system of managing packets to be transmitted using the transmission queue 110, such as User Datagram Protocol (UDP) communication.

The data transmission control unit 205 manages the packets to be transmitted using the transmission queue 110, and controls transmission of data. The data transmission control unit 205 controls the starting/maintaining/ending of the communication connection; the starting of transmission, the stopping of transmission, the restarting of transmission, the retransmission, and the ending of transmission of the packets to be transmitted that are managed with the transmission queue; the transmission of recreated new data, and other operations. The recreated new data does not indicate data identical to data being transmitted, but indicates data that is newly recreated with the intention to discard the data being transmitted. In a case of using a communication system of waiting for a confirmation response while managing packets yet to be transmitted with the transmission queue 110, the data transmission control unit 205 can also manage transmitted packets as to which the confirmation response is yet to be received. The data transmission control unit 205 is used by either one of or both of the LAN communication control unit 202 and the TCP/IP communication control unit 204.

The transmission queue flush unit 206 deletes the packets to be transmitted that are managed with the transmission queue 110 by the data transmission control unit 205. The transmission queue flush unit 206 can delete the packets to be transmitted by overwriting a portion of a memory region in which the packets to be transmitted are stored in the transmission queue 110 with a predetermined value. Alternatively, the transmission queue flush unit 206 can delete the packets to be transmitted by setting a deletion flag to allow another information to be written in the portion in which the packets to be transmitted are stored in the transmission queue 110. The transmission queue flush unit 206 is used by the data transmission control unit 205.

The transmission queue flush determination unit 207 determines whether to delete the packets to be transmitted that are managed with the transmission queue 110 by the data transmission control unit 205. The transmission queue flush determination unit 207 is used by the data transmission control unit 205.

Figure 3:
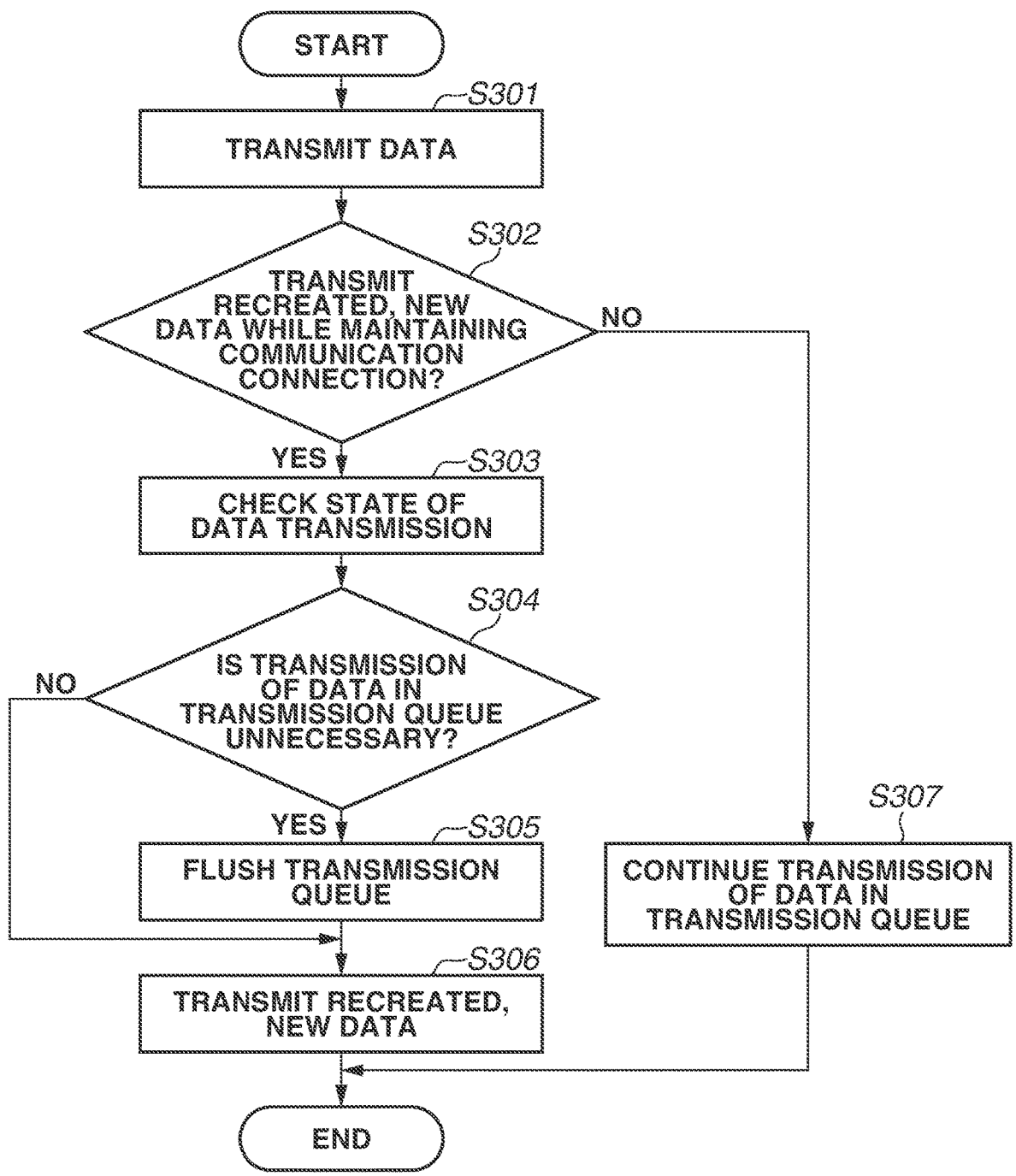
FIG. 3 is a flowchart implemented by the communication apparatus according to a first exemplary embodiment.

FIG. 3 is a data transmission flowchart illustrating a procedure taken by the communication apparatus 10 to determine whether to delete packets yet to be transmitted that are retained in the transmission queue 110 in a case of transmitting recreated new data while maintaining communication connection. The flowchart illustrated in FIG. 3 is implemented by the CPU 103 of the communication apparatus 10 reading out a program stored in the ROM 102 and executing the program. A configuration implementing a part or all of the operations indicated in the flowchart in FIG. 3 with hardware, such as an application-specific integrated circuit (ASIC), can be employed.

There is a possibility that packets yet to be transmitted are retained in the transmission queue 110 in the following cases. Firstly, in a case where communication performance of a network interface deteriorates due to a disturbance, the packets yet to be transmitted are retained in the transmission queue 110. Secondly, in a case where a reception processing capability of an apparatus on another end deteriorates, the packets yet to be transmitted are retained in the transmission queue 110 in the communication apparatus 10 on a transmission side. Thirdly, in a case communication apparatus 10 employs an off-load processing unit, which is not illustrated, the packets yet to be transmitted are retained in the transmission queue 110 by improved efficiency in processing of generating packets to be transmitted. The off-load processing unit is a processing unit that substitutes a part of communication protocol processing executed by the CPU 103 to reduce the load of transmission processing on the CPU 103.

In S301, the TCP/IP communication control unit 204 of the communication apparatus 10 starts a communication connection using the data transmission control unit 205. The TCP/IP communication control unit 204 then manages packets to be transmitted using the transmission queue 110, and transmits data to an apparatus on another end via the communication connection. The LAN communication control unit 202 used by the TCP/IP communication control unit 204 of the communication apparatus 10 can also use the data transmission control unit 205 to manage the packets to be transmitted using the transmission queue 110 and transmit data.

In S302, the data transmission control unit 205 of the communication apparatus 10 determines whether to maintain the communication connection, and whether to recreate new data and transmit the data. In a case where the data transmission control unit 205 determines to recreate new data and transmit the data while maintaining the communication connection (YES in S302), the processing proceeds to S303. In a case where the data transmission control unit 205 determines not to maintain the communication connection or does not recreate new data and transmit the data (NO in S302), the processing proceeds to S307. The data transmission control unit 205 executes the maintaining of the communication connection or the recreation and transmission of new data in response to an operation performed by a user or an instruction given from the application.

In S303, the data transmission control unit 205 of the communication apparatus 10 checks a state of data transmission. Specifically, the data transmission control unit 205 checks a remaining amount of data to be transmitted, a transmission rate of a communication system that the LAN communication control unit 202 performs control, and the like.

In S304, the transmission queue flush determination unit 207 of the communication apparatus 10 determines whether transmission of packets yet to be transmitted that are retained in the transmission queue 110 managed by the data transmission control unit 205 is unnecessary. In a case where the transmission queue flush determination unit 207 determines that the transmission of the packets yet to be transmitted that are retained in the transmission queue 110 is unnecessary (YES in S304), the processing proceeds to S305. In a case where the transmission queue flush determination unit 207 that the transmission of the packets yet to be transmitted that are retained in the transmission queue 110 is necessary (NO in S304), the processing proceeds to S306. The transmission of the packets yet to be transmitted that are retained in the transmission queue 110 being unnecessary is determined, for example, on the condition that an operation is performed by a user or an instruction is given from the application. Alternatively, the transmission being unnecessary is determined on the condition that a remaining amount of data to be transmitted by the data transmission control unit 205, which has been checked in S303, is equal to or larger than a threshold. And the transmission being unnecessary is determined on the condition that the transmission rate of the communication system that the LAN communication control unit 202 performs control, which has been checked in S303, is lower than a threshold, that is, a predetermined time has elapsed in a state where the transmission rate is below a predetermined threshold. Additionally, the transmission being unnecessary is determined on the condition that transmission of data to the apparatus on the other end is not performed for a predetermined time (which can be different from the predetermined time described above). Moreover, a condition of combining these conditions can be used.

In S305, the data transmission control unit 205 of the communication apparatus 10 deletes the packets yet to be transmitted that are retained in the transmission queue 110 using the transmission queue flush unit 206.

In S306, the TCP/IP communication control unit 204 of the communication apparatus 10 recreates and transmits new data while maintaining the communication connection using the data transmission control unit 205.

In S307, the data transmission control unit 205 of the communication apparatus 10 continues transmission of the packets to be transmitted in the transmission queue 110.

As described above, in a case of recreating new data and transmitting such data while maintaining the communication connection, the data transmission control unit 205 of the communication apparatus 10 deletes the packets yet to be transmitted that are retained in the transmission queue 110. As a result, the communication apparatus 10 can promptly transmit the recreated new data.

As described above, even in a case of recreating and transmitting data to be transmitted while the application maintains the communication connection, the communication apparatus 10 deletes the packets yet to be transmitted that are retained in the transmission queue 110, and can thereby promptly transmit recreated data.

In a second exemplary embodiment, a description will be given of a case where the communication apparatus 10 determines whether to flush the transmission queue 110 when stopping transmission while maintaining a communication connection. A hardware configuration and a software configuration of the communication apparatus 10 according to the second exemplary embodiment are similar to those of the first exemplary embodiment.

In the following description, a part similar to that of the first exemplary embodiment will not be repeated.

Figure 4:
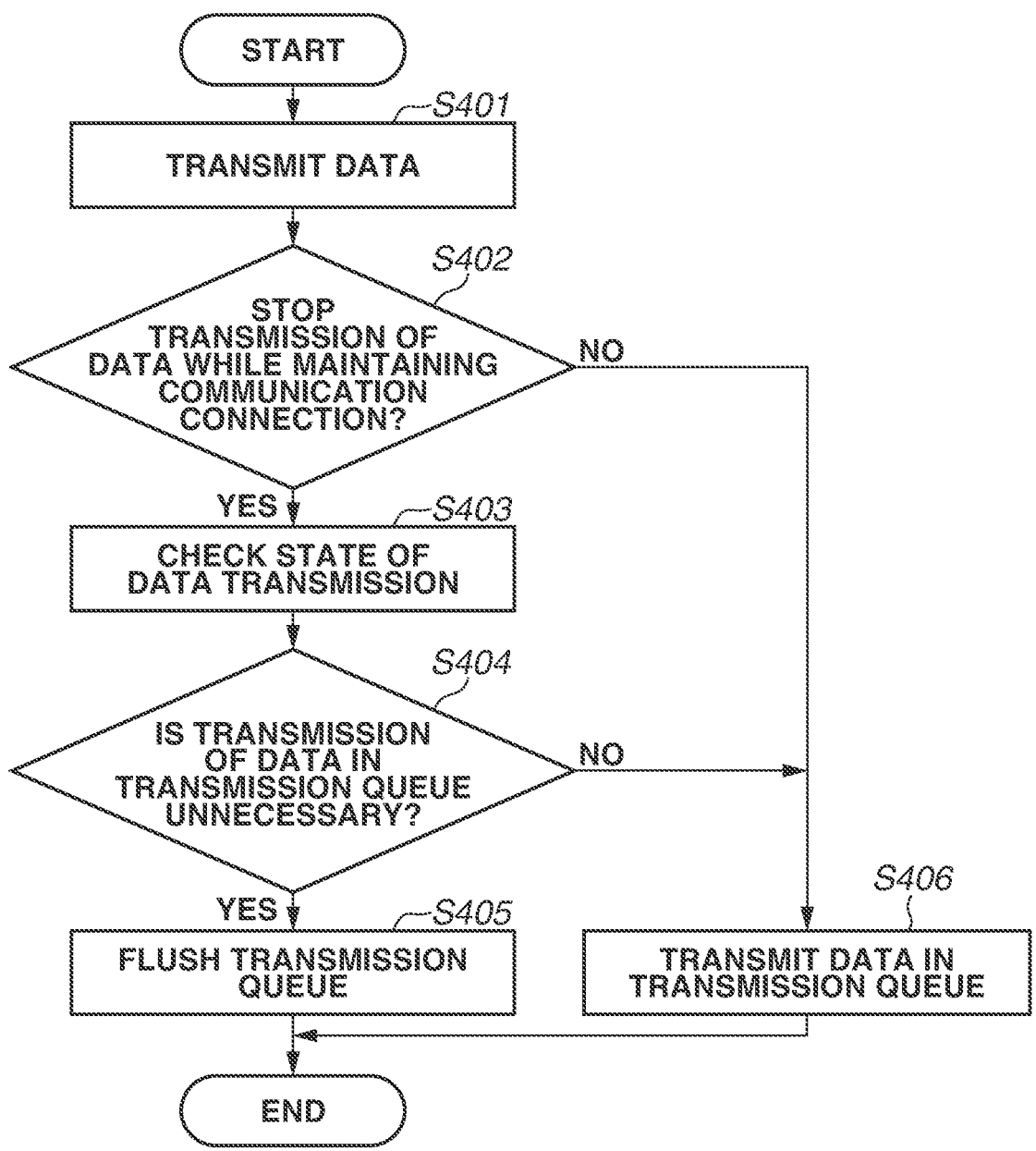
FIG. 4 is a flowchart implemented by a communication apparatus according to a second exemplary embodiment.

FIG. 4 is a data transmission flowchart illustrating a procedure taken by the communication apparatus 10 to determine whether to delete packets yet to be transmitted that are retained in the transmission queue 110 in a case of stopping transmission while maintaining a communication connection. The flowchart illustrated in FIG. 4 is implemented by the CPU 103 of the communication apparatus 10 reading out a program stored in the ROM 102 and executing the program. A configuration implementing a part or all of the operations indicated in the flowchart in FIG. 4 with hardware, such as an ASIC, can be employed.

Processing in S401 is similar to that in S301.

In S402, the data transmission control unit 205 of the communication apparatus 10 determines whether to maintain communication connection, and whether to stop transmission of data. In a case where the data transmission control unit 205 determines to stop transmission of data while maintaining the communication connection (YES in S402), the processing proceeds to S403. In a case where the data transmission control unit 205 determines not to maintain the communication connection or does not stop transmission of data (NO in S402), the processing proceeds to S406. The data transmission control unit 205 executes the maintaining of the communication connection or the stopping of transmission of data in response to an operation performed by a user or an instruction given from the application.

Processing in S403 is similar to that in S303.

In S404, the transmission queue flush determination unit 207 of the communication apparatus 10 determines whether transmission of packets yet to be transmitted that are retained in the transmission queue 110 managed by the data transmission control unit 205 is unnecessary. In a case where the transmission queue flush determination unit 207 determines that the transmission of the packets yet to be transmitted that are retained in the transmission queue 110 is unnecessary (YES in S404), the processing proceeds to S405. In a case where the transmission queue flush determination unit 207 determines that the transmission of the packets yet to be transmitted that are retained in the transmission queue 110 is necessary (NO in S404), the processing proceeds to S406. The transmission of the packets yet to be transmitted that are retained in the transmission queue 110 being necessary is determined on the condition that, for example, an operation is performed by a user, an instruction is given from the application, or the remaining amount of data to be transmitted by the data transmission control unit 205, which has been checked in S403, is smaller than a threshold.

Processing in S405 is similar to that in S305. Processing in S406 is similar to that in S307.

In this manner, in a case of stopping transmission of data while maintaining the communication connection, the data transmission control unit 205 of the communication apparatus 10 deletes the packets yet to be transmitted that are retained in the transmission queue 110 managed by the data transmission control unit 205 using the transmission queue flush unit 206. As a result, the communication apparatus 10 can promptly perform subsequent transmission processing.

In a third exemplary embodiment, a description will be given of a case where the communication apparatus 10 transmits packets yet to be transmitted that are retained in the transmission queue 110 without creating new data.

Communication processing of the third exemplary embodiment will be described below. A hardware configuration and a software configuration of the communication apparatus 10 according to the third exemplary embodiment are also similar to those of the first exemplary embodiment.

FIG. 5 is a flowchart illustrating a procedure taken by the communication apparatus 10 to transmit packets yet to be transmitted that are retained in the transmission queue 110 without transmitting new data in a case of recreating and transmitting the new data while maintaining communication connection. The flowchart illustrated in FIG. 5 is implemented by the CPU 103 of the communication apparatus 10 reading out a program stored in the ROM 102 and executing the program. A configuration implementing a part or all of the operations indicated in the flowchart in FIG. 5 with hardware, such as an ASIC, can be employed.

Processing in S501 to S505 is similar to that in S301 to S305.

In S506, the data transmission control unit 205 of the communication apparatus 10 determines whether to start transmission of the new data. In a case where the data transmission control unit 205 determines to start transmission of the new data (YES in S506), the processing proceeds to S507. In a case where the data transmission control unit 205 determines not to start transmission of the new data (NO in S506), the processing proceeds to S508. Not starting transmission of the new data is determined on the following condition. In a case where the transmission of data in the transmission queue 110 is determined to be necessary in S504 and a remaining amount of data yet to be transmitted, out of the entire data to be transmitted by the data transmission control unit 205, is equal to or smaller than a threshold, the data transmission control unit 205 determines to continue transmission of data in the transmission queue 110 without retransmitting the new data. In a case where the transmission of data in the transmission queue 110 is determined to be necessary in S504 and the transmission rate checked in S503 does not improve, the data transmission control unit 205 can determine to continue transmission of data in the transmission queue 110 without retransmitting the new data.

Processing in S507 and S508 is similar to that in S306 and S307.

In this manner, in the case of recreating and transmitting new data while maintaining the communication connection, there is a case where the data transmission control unit 205 can determine that the transmission of the entire data is completed earlier by continuing transmission of data in the transmission queue 110 than by retransmitting the new data. In this case, the data transmission control unit 205 transmits the packets yet to be transmitted that are retained in the transmission queue 110, but does not transmit the new data. As a result, the communication apparatus 10 can complete the transmission of the entire data earlier than by recreating and transmitting new data.

In a fourth exemplary embodiment, a description will be given of a case where the communication apparatus 10 flushes the transmission queue 110 and ends communication connection, that is, cuts off the communication connection and starts a new communication connection, and then retransmits new data.

Communication processing of the fourth exemplary embodiment will be described below. A hardware configuration and a software configuration of the communication apparatus 10 according to the fourth exemplary embodiment are also similar to those of the first exemplary embodiment.

FIG. 6 is a flowchart illustrating a procedure taken by the communication apparatus 10 to flush the transmission queue 110, end a communication connection without maintaining the communication connection, start a new communication connection, and then retransmit new data. The flowchart illustrated in FIG. 6 is implemented by the CPU 103 of the communication apparatus 10 reading out a program stored in the ROM 102 and executing the program. A configuration implementing a part or all of the operations indicated in the flowchart in FIG. 6 with hardware, such as an ASIC, can be employed.

Processing in S601 to S603 is similar to that in S301 to S303.

In S604, the data transmission control unit 205 of the communication apparatus 10 determines whether to maintain a current communication connection. In a case where the data transmission control unit 205 determines to maintain the communication connection (YES in S604), the processing proceeds to S605. In a case where the data transmission control unit 205 determines not to maintain the communication connection (NO in S604), the processing proceeds to S609. Not maintaining the communication connection is determined based on the following condition. Assuming that a plurality of antennas 107 is mounted on the communication apparatus 10, not maintaining the communication connection is determined in a case where the data transmission control unit 205 checks in S603 that a transmission rate of an antenna that is not currently being used is higher than a transmission rate of an antenna that is currently being used. In this case, the data transmission control unit 205 of the communication apparatus 10 ends the communication connection without maintaining the communication connection, switches an antenna, starts a new communication connection, and thereafter retransmits new data. Alternatively, assuming that the communication apparatus 10 performs wireless communication connection, not maintaining the communication connection is determined in a case where the data transmission control unit 205 checks in S603 that a transmission rate of a frequency band or a channel that is not currently being used is higher than a transmission rate of a frequency band or a channel that is currently being used. Also in this case, the data transmission control unit 205 of the communication apparatus 10 can end the communication connection without maintaining the communication connection, switch a frequency band or a channel, start a new communication connection, and thereafter retransmit new data.

Processing in S605 to S608 is similar to that in S304 to S307.

In S609, the data transmission control unit 205 of the communication apparatus 10 deletes the packets yet to be transmitted that are retained in the transmission queue 110 using the transmission queue flush unit 206. The data transmission control unit 205 of the communication apparatus 10 then ends the communication connection.

In S610, the data transmission control unit 205 of the communication apparatus 10 starts a new communication connection.

In this manner, there is a case where the data transmission control unit 205 can determine that the transmission of the entire data is completed earlier by ending the communication connection to start a new communication connection and thereafter retransmitting new data than by retransmitting the new data while maintaining the communication connection. In this case, the data transmission control unit 205 flushes the packets yet to be transmitted that are retained in the transmission queue 110, and then ends the communication connection without maintaining the communication connection to start a new communication connection. As a result, the communication apparatus 10 can complete the transmission of the entire data earlier than by recreating and transmitting new data while maintaining the communication connection.

OTHER EMBODIMENTS

Some embodiment(s) can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2020-152248, which was filed on Sep. 10, 2020 and which is hereby incorporated by reference herein in its entirety.

What is claimed is:

1. A communication apparatus, comprising:
one or more memories that are configured to implement a transmission queue configured to store a packet to be transmitted that is transmitted to another communication apparatus via a communication connection with the another communication apparatus;
one or more processors that are in communication with the one or more memories, wherein the one or more processors and the one or more memories are configured to
perform a determination that determines, when new data to be transmitted to the another communication apparatus is generated, whether to delete a packet yet to be transmitted from the transmission queue, the packet yet to be transmitted being the packet to be transmitted that is stored in the transmission queue and that has not been transmitted to the another communication apparatus, and
in a case where the determination determines to delete the packet yet to be transmitted, delete the packet yet to be transmitted that is stored in the transmission queue while maintaining the communication connection; and
a communication unit configured to, in a case where the packet yet to be transmitted is deleted, transmit a packet to be transmitted corresponding to the new data to the another communication apparatus via the communication connection.

2. The communication apparatus according to claim 1, wherein, in a case where the determination unit determines not to delete the packet yet to be transmitted, the communication unit transmits the packet yet to be transmitted to the another communication apparatus via the communication connection.

3. The communication apparatus according to claim 1, wherein, in a case where a transmission rate of communication via the communication connection is lower than a first threshold, the one or more processors and the one or more memories are configured to perform the determination to determine whether to delete the packet yet to be transmitted from the transmission queue.

4. The communication apparatus according to claim 1, wherein, in a case where transmission of any packet to the another communication apparatus via the communication connection is not performed for a predetermined time, the one or more processors and the one or more memories are configured to perform the determination to determine whether to delete the packet yet to be transmitted from the transmission queue.

5. The communication apparatus according to claim 1, wherein, in a case where an amount of the packet yet to be transmitted that is stored in the transmission queue is larger than a second threshold, the determination determines to delete the packet yet to be transmitted from the transmission queue.

6. The communication apparatus according to claim 1, further comprising a plurality of antennas,
wherein, in a case where an antenna used for communication with the another communication apparatus is not switched, the one or more processors and the one or more memories are configured to delete the packet yet to be transmitted that is stored in the transmission queue while maintaining the communication connection, and
wherein, in a case where the antenna used for communication with the another communication apparatus is switched, the one or more processors and the one or more memories are configured to cut off the communication connection and delete the packet yet to be transmitted that is stored in the transmission queue.

7. The communication apparatus according to claim 1, wherein the communication connection is connection to perform communication in conformity with the Institute of Electrical and Electronics Engineers (IEEE) 802.11 series.

8. A control method of a communication apparatus including a transmission queue configured to store a packet to be transmitted that is transmitted to another communication apparatus via a communication connection with the another communication apparatus, the method comprising:
- determining, when new data to be transmitted to the another communication apparatus is generated, whether to delete a packet yet to be transmitted from the transmission queue, the packet yet to be transmitted being the packet to be transmitted that is stored in the transmission queue and that has not been transmitted to the another communication apparatus;
- deleting, in a case where the packet yet to be transmitted is determined to be deleted, the packet yet to be transmitted that is stored in the transmission queue while maintaining the communication connection; and
- transmitting, in a case where the packet yet to be transmitted is deleted, a packet to be transmitted corresponding to the new data to the another communication apparatus via the communication connection.

9. A non-transitory computer-readable storage medium storing computer-executable instructions that, when executed by a computer of a communication apparatus including a transmission queue configured to store a packet to be transmitted that is transmitted to another communication apparatus via a communication connection with the another communication apparatus, cause the computer to control the communication apparatus to perform a method comprising:
- determining, when new data to be transmitted to the another communication apparatus is generated, whether to delete a packet yet to be transmitted from the transmission queue, the packet yet to be transmitted being the packet to be transmitted that is stored in the transmission queue and that has not been transmitted to the another communication apparatus;
- deleting, in a case where the packet yet to be transmitted is determined to be deleted, the packet yet to be transmitted that is stored in the transmission queue while maintaining the communication connection; and
- transmitting, in a case where the packet yet to be transmitted is deleted, a packet to be transmitted corresponding to the new data to the another communication apparatus via the communication connection.

* * * * *